(12) United States Patent
Suzuki (10) Patent No.: US 8,606,006 B2
(45) Date of Patent: Dec. 10, 2013

(54) IMAGE PROCESSING APPARATUS, IMAGE PROCESSING METHOD AND RECORDING MEDIUM

(75) Inventor: Ryoichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 71 days.

(21) Appl. No.: 13/333,343

(22) Filed: Dec. 21, 2011

(65) Prior Publication Data

US 2012/0170844 A1    Jul. 5, 2012

(30) Foreign Application Priority Data

Jan. 5, 2011    (JP) ................................. 2011-000368

(51) Int. Cl.
*G06K 9/00* (2006.01)

(52) U.S. Cl.
USPC ........... 382/167; 382/162; 382/274; 358/518; 358/520

(58) Field of Classification Search
USPC .......... 382/162, 164, 165, 167, 274; 358/518, 358/519, 520, 521, 522, 523
See application file for complete search history.

(56) References Cited

U.S. PATENT DOCUMENTS

| | | | |
|---|---|---|---|
| 6,507,412 B1 | 1/2003 | Suzuki et al. | |
| 6,917,441 B2 | 7/2005 | Suzuki et al. | |
| 7,873,213 B2 | 1/2011 | Speigle et al. | |
| 8,379,974 B2 * | 2/2013 | Murray et al. | 382/162 |
| 2003/0198381 A1 * | 10/2003 | Tanaka et al. | 382/166 |
| 2005/0213121 A1 * | 9/2005 | Chang | 358/1.9 |
| 2007/0025199 A1 | 2/2007 | Suzuki | |
| 2008/0316223 A1 * | 12/2008 | Fujinaga | 345/589 |
| 2011/0229023 A1 * | 9/2011 | Jones et al. | 382/162 |
| 2012/0163715 A1 * | 6/2012 | Murray et al. | 382/167 |

FOREIGN PATENT DOCUMENTS

| | | |
|---|---|---|
| JP | 2007-292871 | 11/2007 |
| JP | 2008-086011 | 4/2008 |
| JP | 2008-176158 | 7/2008 |
| JP | 2009-296431 | 12/2009 |
| JP | 2010-028738 | 2/2010 |

* cited by examiner

Primary Examiner — Ali Bayat

(74) Attorney, Agent, or Firm — IPUSA, PLLC (57) ABSTRACT

An image processing apparatus including: a color mode selection receiving unit configured to receive a selection of a color mode used for printing or displaying; a color selection receiving unit configured to receive a selection of a color used for printing or displaying; a color conversion palette generation unit configured to generate a color conversion palette based on the selected color mode and the selected color, the color conversion palette being used for converting original data to be printed or displayed into colors used for printing or displaying; and a color conversion unit configured to convert the original data to be printed or displayed into output data using the color conversion palette when performing printing or displaying.

6 Claims, 10 Drawing Sheets

IMAGE PROCESSING APPARATUS, IMAGE PROCESSING METHOD AND RECORDING MEDIUM

CROSS-REFERENCE TO RELATED APPLICATIONS

This application claims the benefit of a Japanese Patent Application No. 2011-000368 filed on Jan. 5, 2011, the disclosure of which is hereby incorporated by reference.

BACKGROUND OF THE INVENTION

1. Field of the Invention

The present invention relates to a technique of color restriction for printing or displaying by an image processing apparatus.

2. Description of the Related Art

In a full-color printer or a multi-functional printer (MFP), instead of full color or monochrome, color-restricted printing or copying which is in between the full color and the monochrome is known as two-color printing, mono-color printing and the like.

In full-color printing, printing is performed by using color materials (ink, toner, and the like) of four colors (black, cyan, magenta and yellow). On the other hand, in color-restricted printing, printing is performed by using color materials of two or three colors or by restricting colors. The number of colors is reduced so that consumption of toner can be reduced, and resource saving and cost reduction can be realized. Therefore, the color-restricted printing gradually started to be used mainly for office documents by users who are sensitive to their environments. In the following, printing by two colors, three colors or other color restriction is called color-restricted printing.

It is said that more than about 200 million people are partially color-blind or color-blind in the world population. Also, considering people having eye diseases, there are considerable amount of people having color vision deficiency. Although there are some types of partial color blindness and color blindness, there is a fear that particular people cannot recognize printed materials if printing is performed by only particular colors. To address such a problem, printing that supports color universal design (proposed by Color Universal Design Organization) is known.

There are conventional printers and the like that support the above-mentioned color-restricted printing. However, in the conventional printers, there is no flexibility in selecting colors for use for the color-restricted printing.

Also, in almost all of commercially available printers, even when only a color material of one color lacks, printing cannot be performed. This is similar to full-color printing. The reason is that printing of the preset number of colors cannot be performed normally due to lack of the color material. Therefore, even though color materials of other colors are remaining, any of the colors cannot be used in lieu of the lacking material. Thus, remaining color materials cannot be utilized efficiently.

Japanese Laid-Open Patent Application No. 2008-86011 (patent document 1) discloses a color printing method for selecting a correction method according to contents of an image in order to restore a color that a color-blind user can easily recognize. However, in this technique, color correction is performed when full-color printing is performed, and this technique does not target at images other than full color.

Similarly to printing, there are the same problems in displaying an image on a monitor except for lack of color material.

SUMMARY OF THE INVENTION

Accordingly, it is an object of an embodiment of the present invention to enhance flexibility in color selection and to obtain a printed material or a display screen that even a color deficient observer can easily recognize when performing color-restricted printing or displaying.

According to an embodiment, there is provided an image processing apparatus including:

a color mode selection receiving unit configured to receive a selection of a color mode used for printing or displaying;

a color selection receiving unit configured to receive a selection of a color used for printing or displaying;

a color conversion palette generation unit configured to generate a color conversion palette based on the selected color mode and the selected color, the color conversion palette being used for converting original data to be printed or displayed into colors used for printing or displaying; and a color conversion unit configured to convert the original data to be printed or displayed into output data using the color conversion palette when performing printing or displaying.

According to another embodiment, there is provided an image processing method performed by an image processing apparatus, including:

a color mode selection receiving step of receiving a selection of a color mode used for printing or displaying;

a color selection receiving step of receiving a selection of a color used for printing or displaying;

a color conversion palette generation step of generating a color conversion palette based on the selected color mode and the selected color, the color conversion palette being used for converting original data to be printed or displayed into colors used for printing or displaying; and a color conversion step of converting the original data to be printed or displayed into output data using the color conversion palette when performing printing or displaying.

According to still another embodiment, there is provided a non-transitory computer readable recording medium storing a program which causes a computer forming an image processing apparatus to function as:

a color mode selection receiving unit configured to receive a selection of a color mode used for printing or displaying;

a color selection receiving unit configured to receive a selection of a color used for printing or displaying;

a color conversion palette generation unit configured to generate a color conversion palette based on the selected color mode and the selected color, the color conversion palette being used for converting original data to be printed or displayed into colors used for printing or displaying; and a color conversion unit configured to convert the original data to be printed or displayed into output data using the color conversion palette when performing printing or displaying.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to figures.

Outline of Embodiments

Before describing embodiments in detail, an outline of the embodiments is described below.

According to an embodiment, there is provided an image processing apparatus including:

a color mode selection receiving unit configured to receive a selection of a color mode used for printing or displaying;

a color selection receiving unit configured to receive a selection of a color used for printing or displaying;

a color conversion palette generation unit configured to generate a color conversion palette based on the selected color mode and the selected color, the color conversion palette being used for converting original data to be printed or displayed into colors used for printing or displaying; and a color conversion unit configured to convert the original data to be printed or displayed into output data using the color conversion palette when performing printing or displaying.

In the image processing apparatus, the color selection receiving unit may display a color selection screen for selecting plural colors and receives selections of plural colors. The image processing apparatus may further include a color restriction unit configured to restrict colors that can be selected by the color selection receiving unit when the color mode selection receiving unit receives a color selection based on color universal design as a color mode.

In the image processing apparatus, the color mode selection receiving unit may receive a selection of a color mode selected from among items of color sense types displayed using characters, and the color selection receiving unit may restrict colors that can be selected based on the color sense type of the selected color mode.

Also, the image processing apparatus may further includes a color restriction unit configured to restrict colors that can be selected by the color selection receiving unit based on a remaining amount of a color material of an image forming apparatus that is an output destination when performing printing.

According to the image processing apparatus, when performing color-restricted printing or displaying, flexibility in color selection can be enhanced, and a printed material or a display screen that even a color deficient observer can easily recognize can be obtained by appropriately supporting concepts of the color universal design.

Configuration

Figure 1:
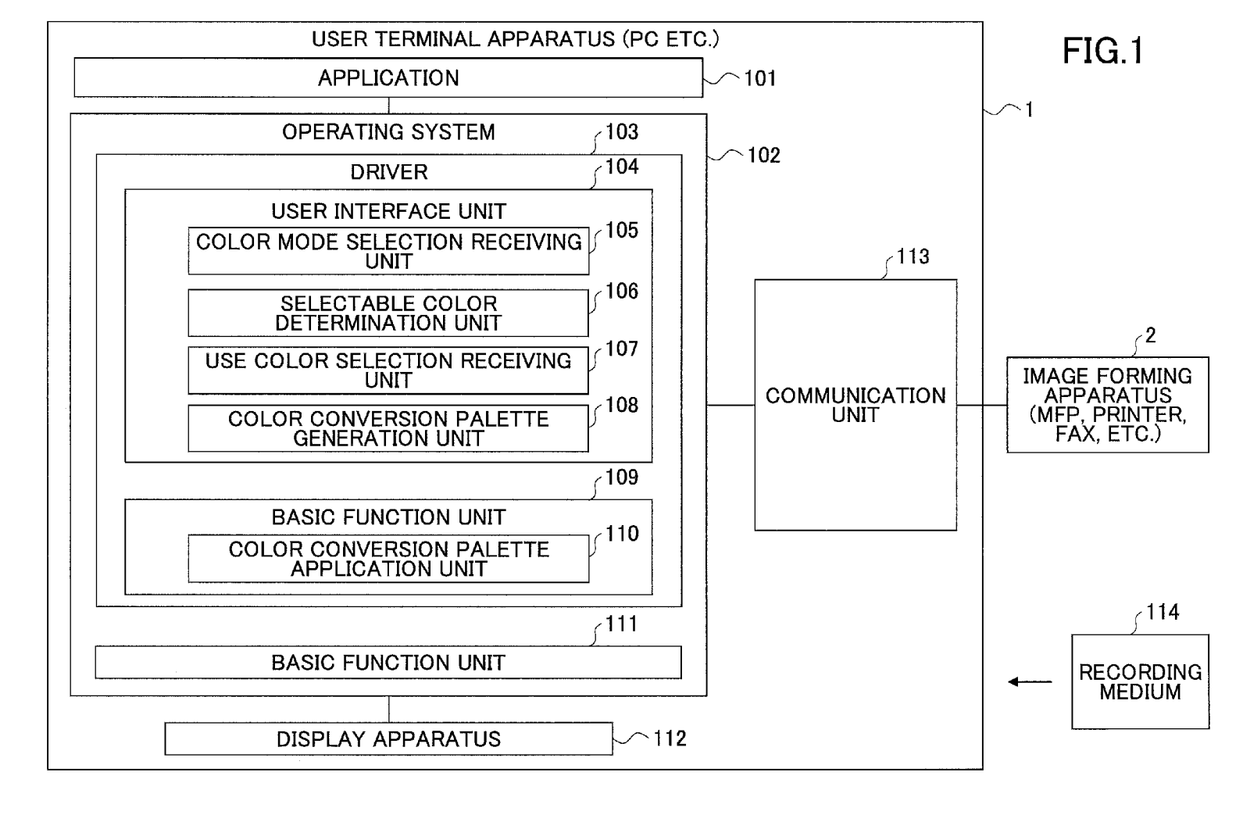
FIG. 1 is a diagram showing a configuration example of a system of an embodiment.

FIG. 1 is a diagram showing a configuration example of a system of an embodiment.

As shown in FIG. 1, a user terminal apparatus 1 such as a personal computer (PC) which includes a processor is connected to an image forming apparatus 2 such as an MFP directly or via a network.

The user terminal apparatus 1 includes an application 101 that performs document creation and the like, an operating system 102 that is basic software, a display apparatus 112 that displays a screen and a communication unit 113 that performs communication with the image forming apparatus 2 via a network and the like.

The operating system 102 includes a driver configured to control operation of the image forming apparatus 2 and the display apparatus 112, and a basic function unit 111 configured to perform basic operation as an operating system.

The driver 103 includes a user interface unit 104 configured to make settings of operation conditions by interacting with a user, and a basic function unit 109 configured to perform basic operation as a driver. The user interface unit 104 includes a color mode selection receiving unit 105, a selectable color determination unit 106, a use color selection receiving unit 107 and a color conversion palette generation unit 108.

The color mode selection receiving unit 105 is configured to receive a selection of a color mode used for printing or displaying from a user.

The selectable color determination unit 106 is configured to determine colors selectable by a user based on designation of the color universal design by the color mode or based on a remaining amount of color materials in printing or the like.

The use color selection receiving unit 107 is configured to receive a selection of a color from a user via a predetermined interface when color selection is designated by the user.

The color conversion palette generation unit 108 is configured to generate a color conversion palette that is used for converting a color of drawing data to be output to the image forming apparatus 2 or a color of display data to be output to the display apparatus based on the color selected by the user.

The basic function unit 109 includes a color conversion palette application unit 110. The color conversion palette application unit 110 is configured to perform color conversion for the drawing data to be output to the image forming apparatus 2 or the display data to be output to the display apparatus 112 by using the color conversion palette generated by the color conversion palette generation unit 108 of the user interface unit 104.

The color conversion palette may be configured as a table or a calculation equation in which RGB to be output is associated with all combinations of RGB (Red, Green, Blue), for example. Alternatively, the color conversion palette may be configured as a table or a calculation in which color hues (ratio of RGB, for example) to be output are associated with all hues of RGB, for example. In the latter case, a hue and a brightness (average of RGB, for example) are calculated based on input RGB, a hue to be output is obtained from the table and the like based on the calculated hue, and the hue to be output is multiplied by the brightness so that RGB data to be output is obtained. In general, conversion from RGB to CMYK (Cyan, Magenta, Yellow, black) for printing is performed in the image forming apparatus 2 side.

For example, the driver 103 of the embodiment is a program that can be installed in a memory of the user terminal apparatus 1 which is a computer including a processor and the memory and the like. Then, the program is executed by the processor so that the above-mentioned functions of each unit can be realized. The user terminal apparatus is an example of an image processing apparatus. Also, the program can be stored in a non-transitory computer readable recording medium such as a portable memory, an SD card, CD-ROM and the like. The program can be read from the non-transitory computer readable recording medium and can be installed in the user terminal apparatus 1. FIG. 1 shows such a recording medium 114 which is a portable memory, for example.

Operation

Figure 2:
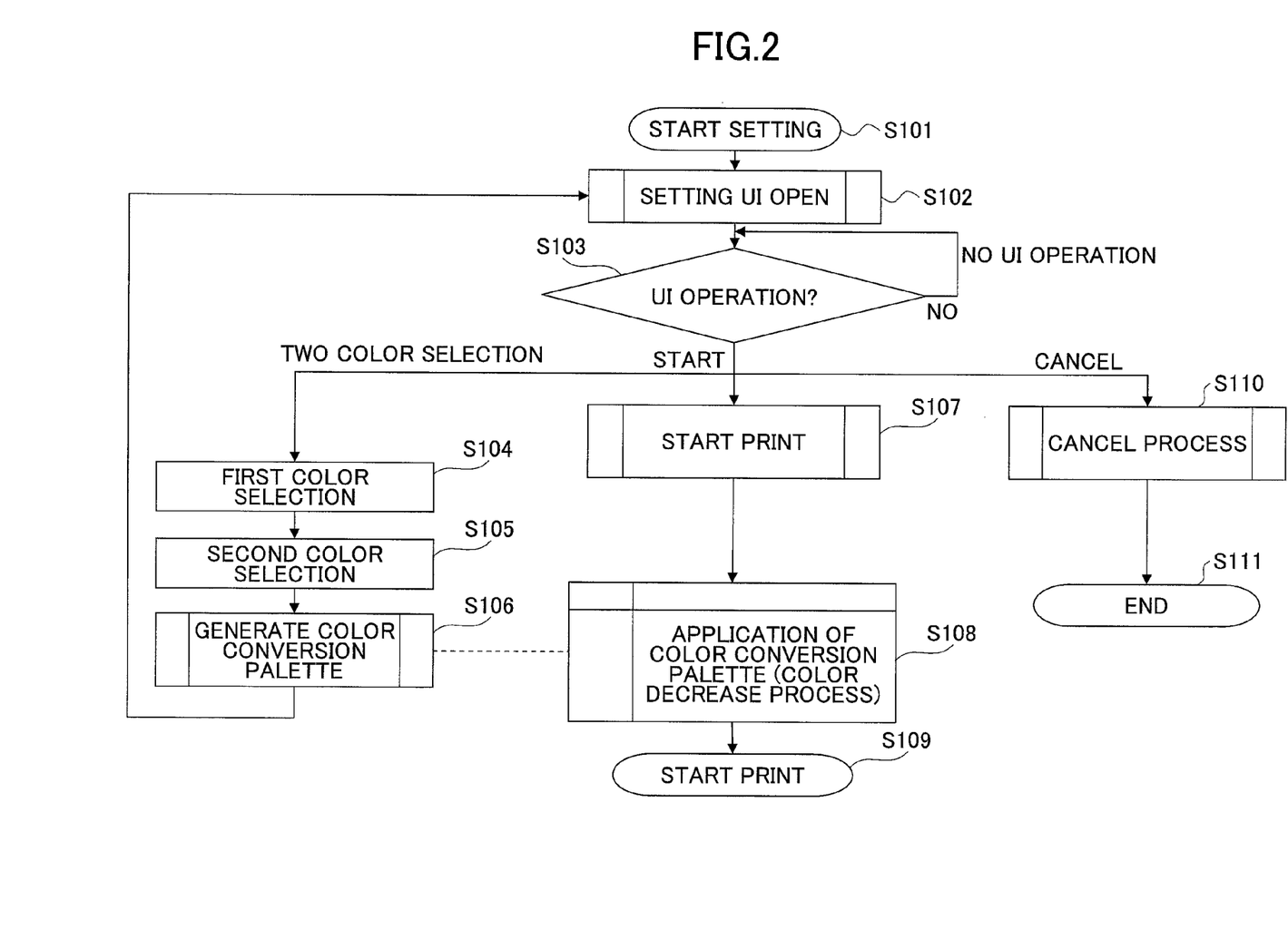
FIG. 2 is a flowchart showing a first processing example.

FIG. 2 is a flowchart showing a first processing example. In the first processing example, it is assumed that the driver 103 is a printer driver and that the image forming apparatus 2 performs arbitrary two-color printing.

As shown in FIG. 2, first, the application 101 opens a data file to be printed, and print setting starts by a print start instruction in step S101. Then, a print setting screen as a print setting UI (user interface) is displayed on the display apparatus 112 by the user interface unit 104 of the driver 103 in step S102. The print setting UI waits for UI operation as it is until a user operates the print setting UI (No in step S103).

Figure 3:
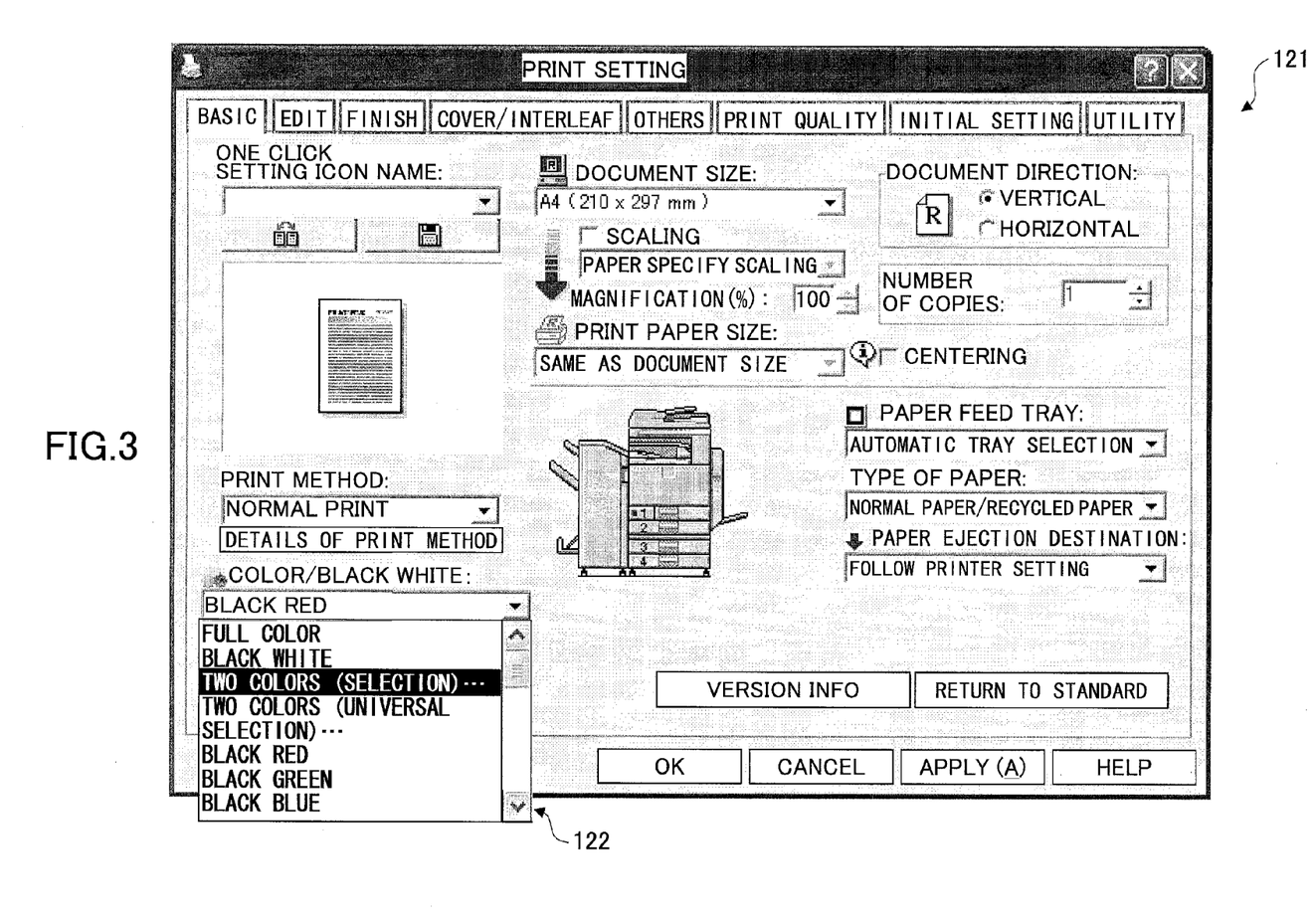
FIG. 3 is a diagram showing an example of a print setting screen in the first processing example.

FIG. 3 shows an example of the print setting screen 121 displayed by the color mode selection receiving unit 105. On the print setting screen 121, desired items can be selected from the color mode selection menu 122. In this example, a use can select from among "full color", "black and white", "two colors (selection)", "two colors (universal selection)", "black and red", "black and green", "black and blue" and the like.

Returning to FIG. 2, if the user selects "two color selection" (corresponding to "two colors (selection)" in FIG. 3) in step S103, the use color selection receiving unit 107 of the user interface unit 104 receives a first color selection by the user from a color setting screen in step S104. The first color is a representative color used for printing.

Figure 4A:
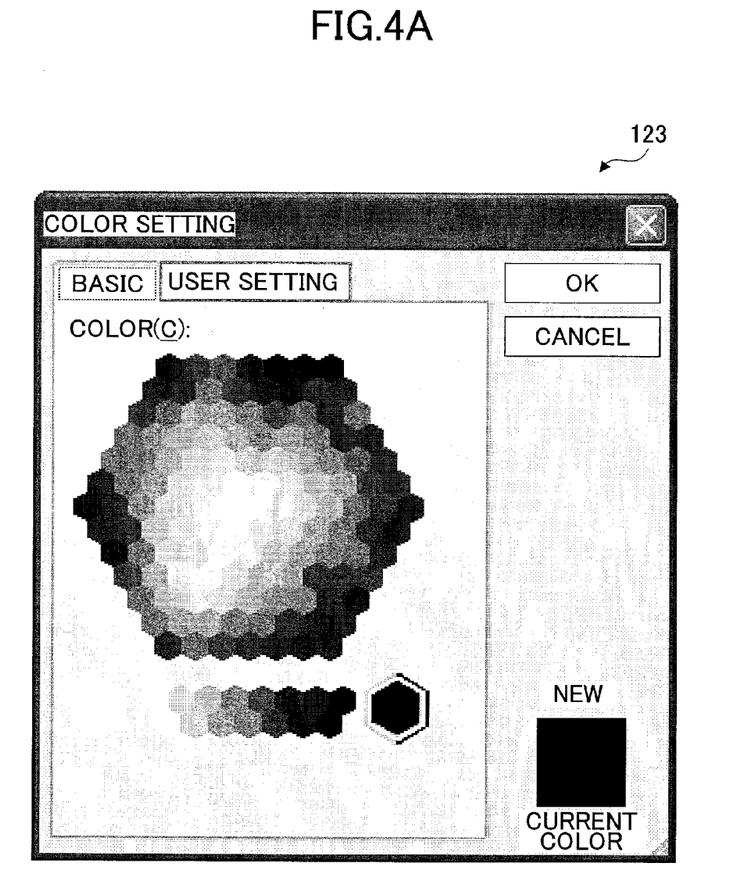
FIGS. 4A and 4B are diagrams showing examples of color setting screens in the first processing example.
Figure 4B:
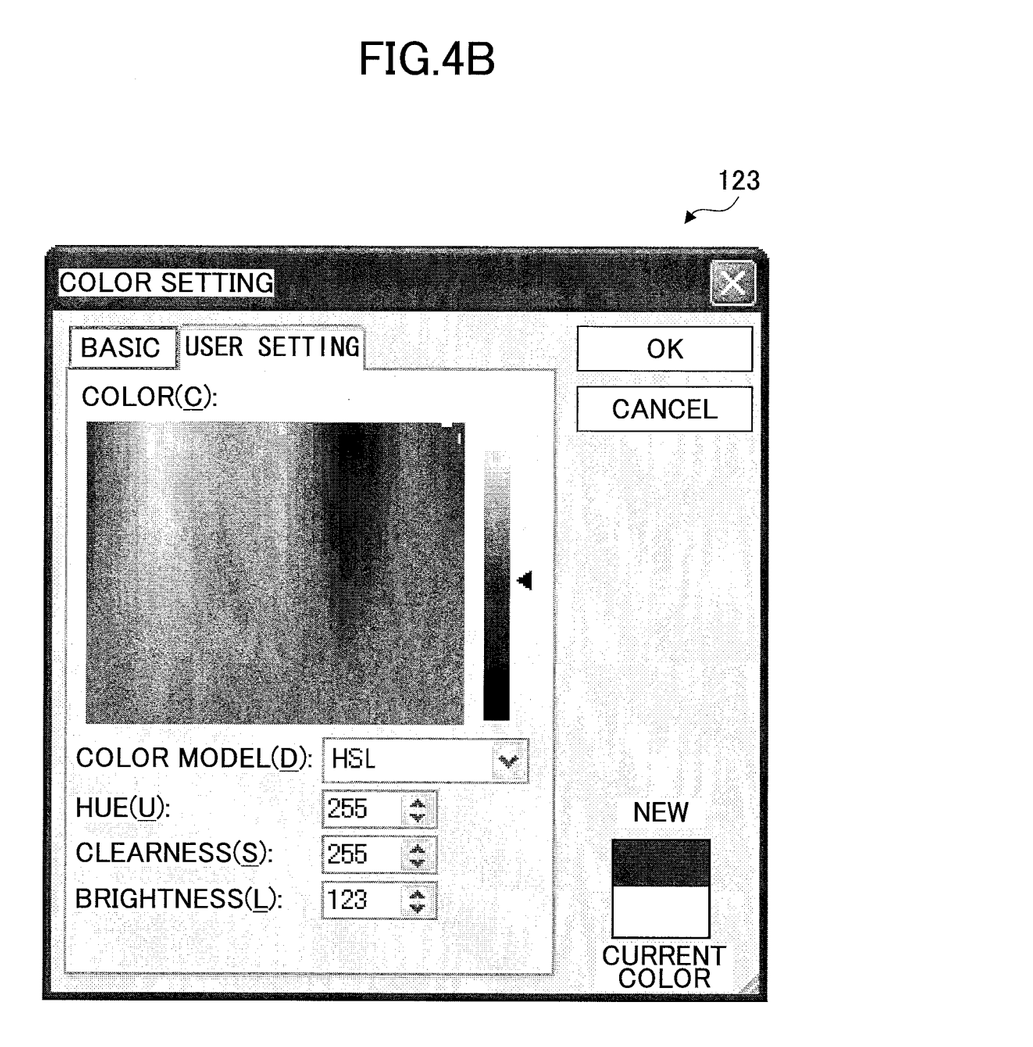

FIGS. 4A and 4B show examples of the color setting screen 123. FIG. 4A shows an example in which a color can be selected from a screen where different colors are arranged like a honeycomb shape. FIG. 4B shows an example in which a color can be selected from a screen where colors are arranged gradationally. The color arrangement is not limited to the above-mentioned examples. For example, a slider-like user interface placed on a color spectrum may be used. Also, a user interface in which colors are arranged continuously on the circumference of a circle may be used. Also, a user interface in which a several number of color candidates are arranged like tiles may be used. In any case, some sort of restriction is necessary for representing the color space two-dimensionally. Thus, since all colors cannot be arranged, simplification is necessary to some extent.

Returning to FIG. 2, the user terminal apparatus 1 receives a selection of a second color from the user in step S105. In the present embodiment, a color corresponding to black is selected as the second color. The color setting screen is one similar to that shown in FIGS. 4A and 4B. In this embodiment, only the first color and the second color selected by the user may be used. In addition, black may be used as a third color. In addition, only the first color may be selected by the user and the second color may be preset as black.

Next, returning to FIG. 2, the color conversion palette generation unit 108 generates a color conversion palette based on the first and second colors selected by the user in step S106. There are various known color reduction methods. In generation of the color conversion palette, which color should be mapped to which color can be determined based on one of the known color reduction methods.

After the color palette is generated in step S106, the process returns to the print setting UI.

Next, after the colors are designated and start of printing is instructed ("start" in step S103), the driver 103 starts printing in step S107. The color conversion palette application unit 110 performs color reduction processing according to the color conversion palette generated as mentioned before in step S108. Then, the user terminal apparatus 1 sends print data to the image forming apparatus 2 in step S109.

When "cancel" is selected on the print setting UI ("cancel" in step S103), internal data is initialized by canceling processing as necessary in step S110, and the process ends in step S111 without any processing for printing.

Although a case in which printing is performed by the image forming apparatus 2 has been described, in a case in which data is displayed on the display apparatus 112, processing the same as the above-mentioned processing of FIG. 2 is performed in which "print" in FIG. 2 is replaced with "display".

Figure 5:
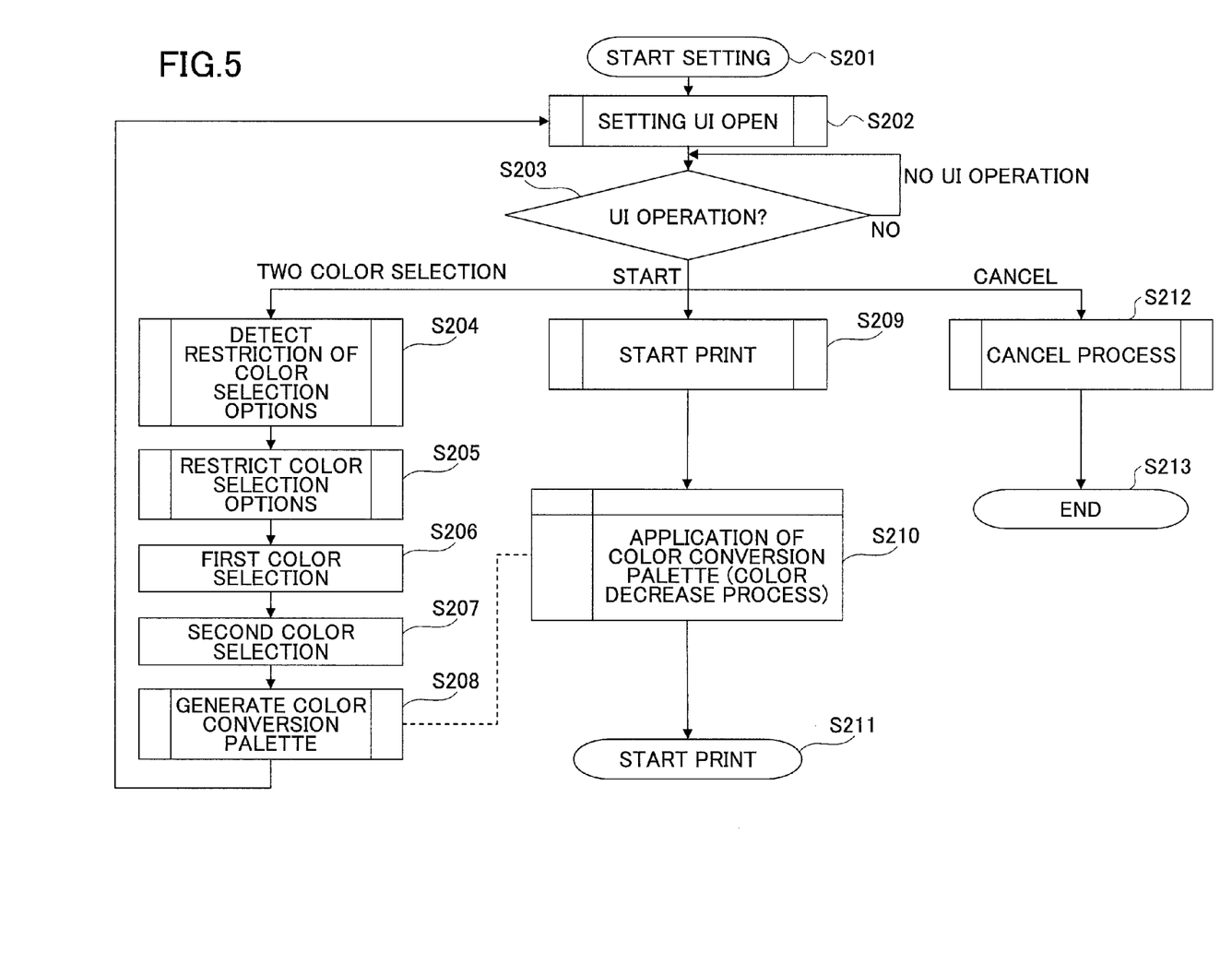
FIG. 5 is a flowchart showing a second processing example.

FIG. 5 is a flowchart showing a second processing example in which it is assumed that the driver 103 is a printer driver, and that two-color printing is performed by the image forming apparatus 2 in which color selections are limited.

As shown in FIG. 5, first, the application 101 opens a data file to be printed, and print setting starts by a print start instruction in step S201. Then, a print setting screen as a print setting UI is displayed on the display apparatus 112 by the user interface unit 104 in step S202. The print setting UI waits for UI operation as it is until a user operates the print setting UI (No in step S203).

Figure 6:
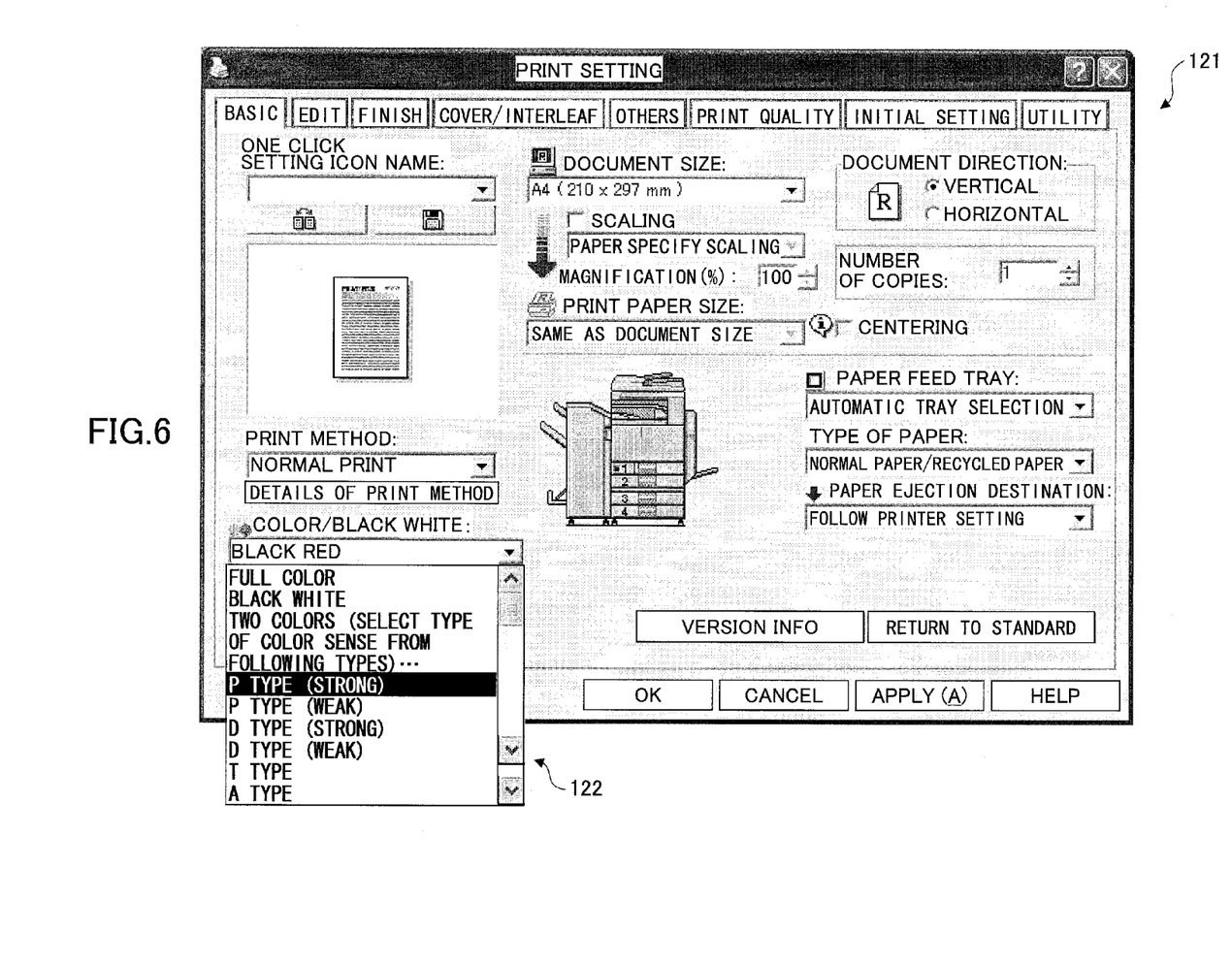
FIG. 6 is a diagram showing an example of a print setting screen in the second processing example.

FIG. 6 shows an example of the print setting screen 121 displayed by the color mode selection receiving unit 105. On the print setting screen 121, desired items can be selected from the color mode selection menu 122. In this example, a use can select from among "full color", "black and white", "two colors (select a type of color sense from following types)", "P type (strong)", "P type (weak)", "D type (strong)", "D type (weak)", "T type" and "A type" and the like. There are several patterns (types) in color sense deficiency. By presenting the types on the screen, if the user knows the user's type, the user can select a type corresponding to the user' type from the menu on which the types are shown using characters (letters).

Returning to FIG. 5, if the user selects "two color selection" which corresponds to an item selection below "two colors (select a type of color sense from following types)" of FIG. 6 (two color selection in step S203), the selectable color determination unit 106 of the user interface unit 104 detects that restriction for color selection choices is necessary due to the selection of the color sense type in step S204. Also, the selectable color determination unit 106 obtains remaining amounts of color materials by communication with the image forming apparatus 2, the communication with the image forming apparatus 2 being performed by a basic function of the driver beforehand or dynamically, so that the selectable color determination unit 106 detects that restriction for color selection choices is necessary also when there is a color material of which remaining amount is small.

Next, when the selectable color determination unit 106 detects that restriction for color selection choices is necessary due to the selection of the color sense type, the selectable color determination unit 106 restricts color selection choices according to a table and the like held inside corresponding to the color sense type in step S205. When the selectable color determination unit 106 detects that restriction for color selection choices is necessary due to lack of a color material, the selectable color determination unit 106 restricts color selection choices by excluding the lacking color material.

Next, the use color selection receiving unit 107 receives a first color selection by the user from the color setting screen in step S206. The first color is a representative color used for printing.

Figure 7:
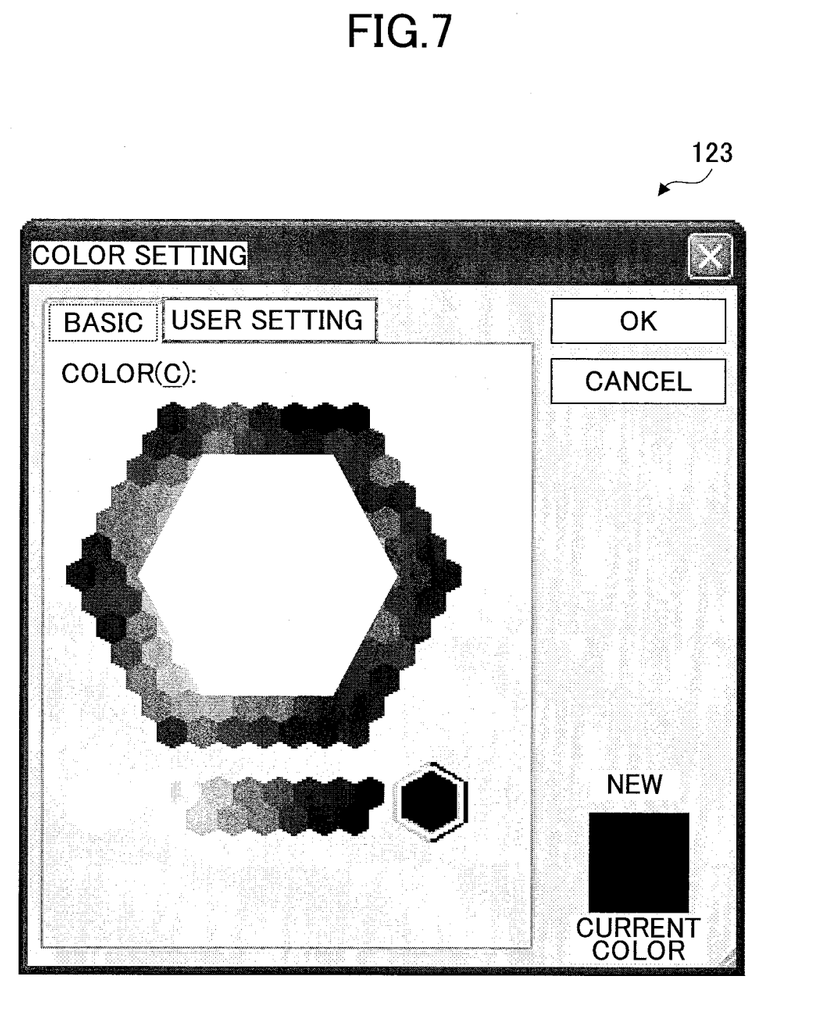
FIG. 7 is a diagram showing an example of a color setting screen in the second processing example.

FIG. 7 shows an example of the color setting screen 123 in which only colors easy to recognize by the user of the selected color sense type are left based on the color universal design, and colors that are not recommended in the color universal design are removed. According to the screen, the color deficient observer can select colors easy to see from among colors used for printing, so that an optimal printed material can be obtained for the user.

Figure 8A:
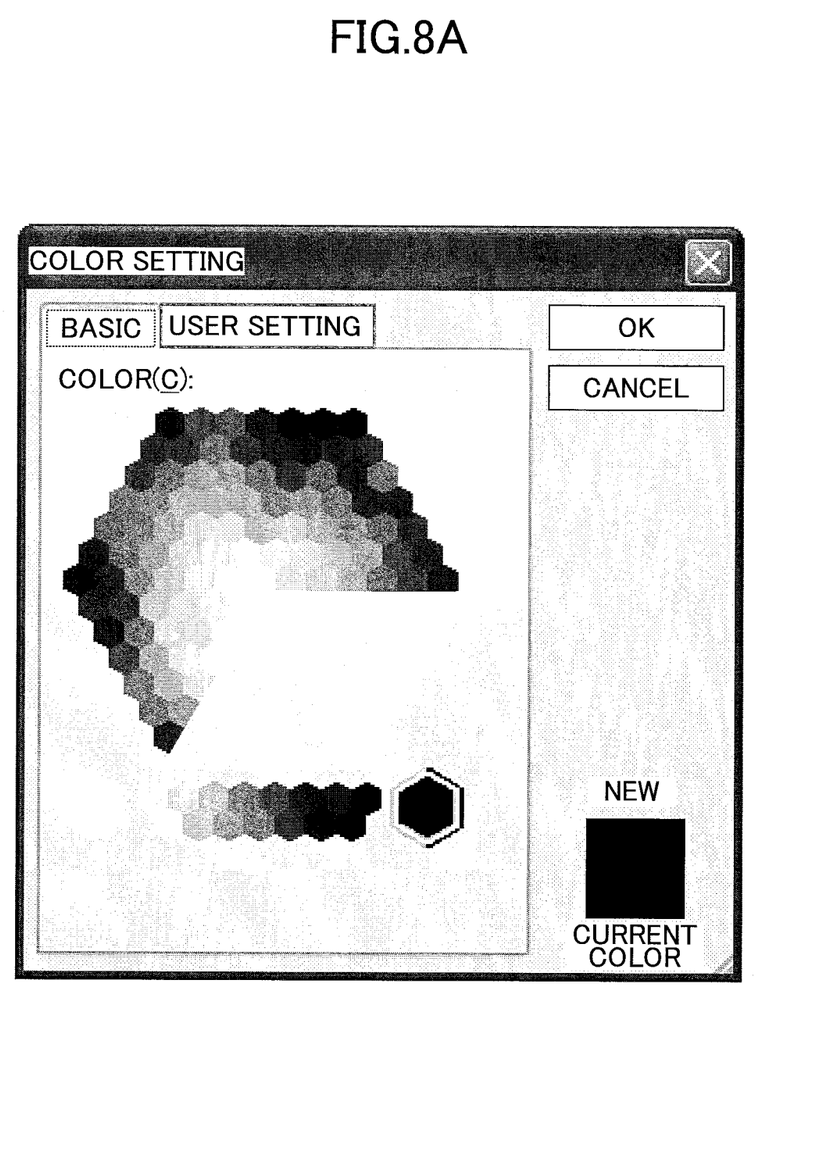
FIGS. 8A and 8B are diagrams showing examples of color setting screens in the second processing example.
Figure 8B:
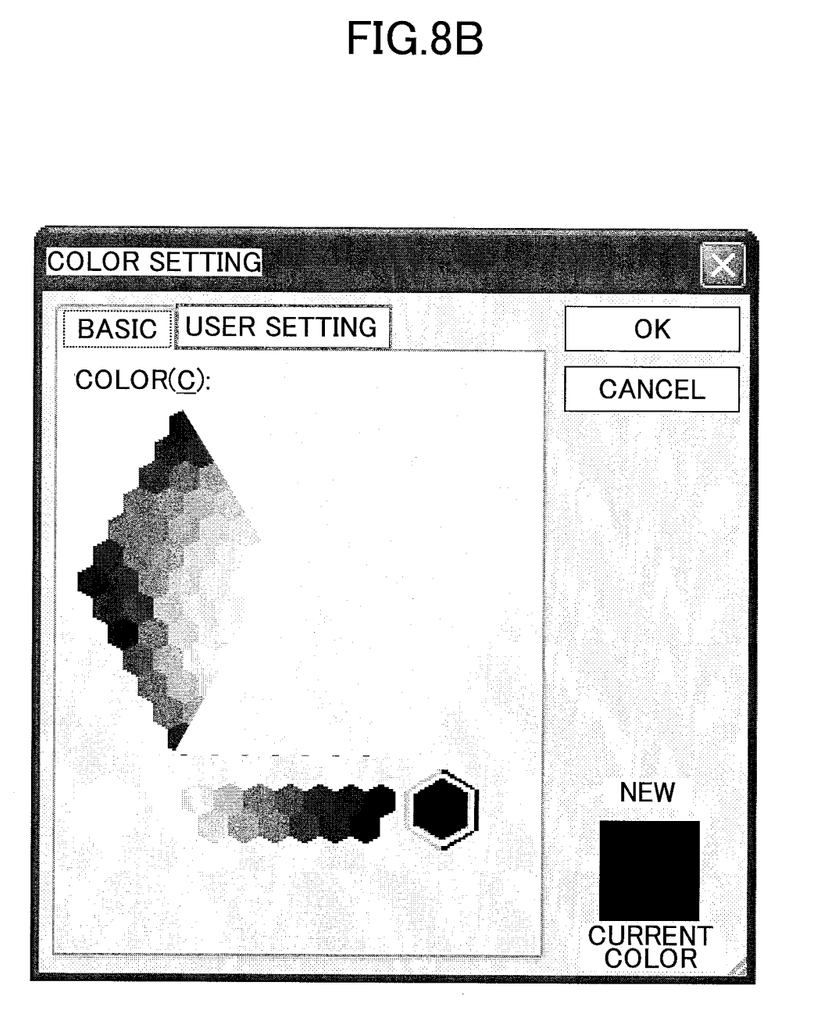

FIGS. 8A and 8B show other examples of the color setting screen 123. FIG. 8A shows a screen in which, in the case where a remaining amount of a color material (magenta, for example) is small, colors that use a large amount of the lacking color material are excluded. For example, when the color material is magenta, red-based colors in which density of magenta is high are excluded. FIG. 8B shows a screen in which, in the case where almost none of a color material (magenta, for example) remains, colors using the color material are fully excluded. Since the user has to select from among colors from which some colors are excluded as mentioned above, printing that uses the lacking color material is excluded inevitably so that color printing is available without the color material. On the other hand, if the color material is added or if other color materials decrease similarly to the lacking color material, there is no reason to exclude only the lacking color material. Thus, in this case, it can be considered that the screen is changed to the screen of FIG. 8A or no restriction is applied by returning to the original state.

Returning to FIG. 5, the user terminal apparatus receives a selection of a second color from the user in step S207. In the present embodiment, the second color is a color corresponding to black. The color setting screen is one similar to that shown in FIG. 7 and FIGS. 8A and 8B. In this embodiment, only the first color and the second color selected by the user may be used. Also, black may be used as a third color. In addition, only the first color may be selected by the user and the second color may be preset as black.

Next, returning to FIG. 5, the color conversion palette generation unit 108 generates a color conversion palette based on the first and the second colors selected by the user in step S208. There are various known color reduction methods. In generation of the color conversion palette, which color should be mapped to which color can be determined based on one of the known color reduction methods.

After the color palette is generated in step S208, the process returns to the print setting UI.

Next, after the colors are designated and start of printing is instructed ("start" in step S203), the driver 103 starts printing in step S209. The color conversion palette application unit 110 performs color reduction processing according to the color conversion palette generated as mentioned before in step S210. Then, the user terminal apparatus 1 sends print data to the image forming apparatus 2 in step S211.

When "cancel" is selected on the print setting UI ("cancel" in step S203), internal data is initialized by cancel processing as necessary in step S212, and the process ends in step S213 without any processing for printing.

Although a case in which printing is performed by the image forming apparatus 2 has been described, in a case in which data is displayed on the display apparatus 112, processing the same as the above-mentioned processing of FIG. 5 is performed in which "print" in FIG. 5 is replaced with "display".

Effects

As mentioned before, there are conventional printers that support the above-mentioned color-restricted printing. However, in the conventional printers, printing is performed with preset colors. Therefore, even though a user wants to perform printing using favorite colors, there is no such flexibility. For example, there is a printer in which the user can select from among "black and red", "black and green", "black and blue", "black and magenta", "black and yellow" and "black and cyan" and the like. However, in such a printer, only preset particular colors can be selected. When a user says "red", the user may mean bright red, red near black or red near pink. Thus, it is not possible to recognize accurate color only by the name of the color. So, favorite colors cannot be used. If a color deficient observer feels difficulty in recognizing the preset colors, there is no means for changing the colors to other colors.

On the other hand, as described above, there are following advantages in the present embodiment.

(1) In printing or displaying using restricted colors other than full color and black and white, instead of performing printing or displaying with predetermined colors, the user can select colors which the user can easily recognize (the user can select colors for conversion). Thus, ordinary persons can use favorable colors. Color deficient observers such as partial color-blind persons and color-blind persons can obtain printed materials and displayed screens that can be easily recognized.

(2) By providing a menu of color sense types such that a type of color sense can be selected, even a color deficient user can obtain printed materials or displayed screens that can be easily recognized without the extra efforts of selecting colors plural times.

(3) As for printing, even when a remaining amount of a color material decreases, fairly good-looking printed material can be obtained without prohibiting printing. Thus, color materials can be efficiently utilized, and the rate of operation of the image forming apparatus can be increased.

Although embodiments are described using concrete examples, the present invention is not limited to these embodiments, but various variations and modifications may be made without departing from the broad principle and the scope of the present invention. That is, the present invention should not be limited by the detailed description of the embodiments and the drawings.

What is claimed is:

1. An image processing apparatus comprising:
    a color mode selection receiving unit configured to receive a selection of a color mode used for printing or displaying;
    a color selection receiving unit configured to receive a selection of a color used for printing or displaying;
    a color conversion palette generation unit configured to generate a color conversion palette based on the selected color mode and the selected color, the color conversion palette being used for converting original data to be printed or displayed into colors used for printing or displaying;
    a color conversion unit configured to convert the original data to be printed or displayed into output data using the color conversion palette when performing printing or displaying, and
    a color restriction unit configured to restrict colors that can be selected by the color selection receiving unit based on a remaining amount of a color material of an image forming apparatus that is an output destination when performing printing.

2. The image processing apparatus as claimed in claim 1, wherein the color selection receiving unit displays a color selection screen for selecting plural colors and receives selections of plural colors.

3. The image processing apparatus as claimed in claim 1, further comprising:
a color restriction unit configured to restrict colors that can be selected by the color selection receiving unit when the color mode selection receiving unit receives a color selection based on color universal design as a color mode.

4. The image processing apparatus as claimed in claim 3, wherein
the color mode selection receiving unit receives a selection of a color mode selected from among items of color sense types displayed using characters, and
the color selection receiving unit restricts colors that can be selected based on the color sense type of the selected color mode.

5. An image processing method performed by an image processing apparatus, comprising:
a color mode selection receiving step of receiving a selection of a color mode used for printing or displaying;
a color selection receiving step of receiving a selection of a color used for printing or displaying;
a color conversion palette generation step of generating a color conversion palette based on the selected color mode and the selected color, the color conversion palette being used for converting original data to be printed or displayed into colors used for printing or displaying;
a color conversion step of converting the original data to be printed or displayed into output data using the color conversion palette when performing printing or displaying, and
a color restriction step of restricting colors that can be selected by the color selection receiving step based on a remaining amount of a color material of an image forming apparatus that is an output destination when performing printing.

6. A non-transitory computer readable recording medium storing a program which causes a computer forming an image processing apparatus to function as:
a color mode selection receiving unit configured to receive a selection of a color mode used for printing or displaying;
a color selection receiving unit configured to receive a selection of a color used for printing or displaying;
a color conversion palette generation unit configured to generate a color conversion palette based on the selected color mode and the selected color, the color conversion palette being used for converting original data to be printed or displayed into colors used for printing or displaying;
a color conversion unit configured to convert the original data to be printed or displayed into output data using the color conversion palette when performing printing or displaying, and
a color restriction unit configured to restrict colors that can be selected by the color selection receiving unit based on a remaining amount of a color material of an image forming apparatus that is an output destination when performing printing.

* * * * *